(12) United States Patent
Ayoub et al.

(10) Patent No.: US 9,384,217 B2
(45) Date of Patent: Jul. 5, 2016

(54) TELESTRATION SYSTEM FOR COMMAND PROCESSING

(71) Applicant: General Instrument Corporation, Horsham, PA (US)

(72) Inventors: Ramy S. Ayoub, Arlington Heights, IL (US); Swee M. Mok, Palatine, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 560 days.

(21) Appl. No.: 13/794,763

(22) Filed: Mar. 11, 2013

(65) Prior Publication Data
US 2014/0253472 A1 Sep. 11, 2014

(51) Int. Cl.
*G06F 17/30* (2006.01)
*H04N 21/234* (2011.01)
*H04N 21/254* (2011.01)
*H04N 21/4722* (2011.01)
*H04N 21/4728* (2011.01)
*G06F 3/0488* (2013.01)
*G06F 3/0484* (2013.01)
*H04N 21/422* (2011.01)

(52) U.S. Cl.
CPC ...... *G06F 17/30277* (2013.01); *G06F 3/04842* (2013.01); *G06F 3/04883* (2013.01); *H04N 21/23418* (2013.01); *H04N 21/254* (2013.01); *H04N 21/4722* (2013.01); *H04N 21/4728* (2013.01); *H04N 21/42222* (2013.01); *H04N 21/42224* (2013.01)

(58) Field of Classification Search
CPC .......... G06F 17/30277; G06F 3/04842; G06F 3/04883; H04N 21/23418
See application file for complete search history.

(56) References Cited

U.S. PATENT DOCUMENTS 5,953,076 A 9/1999 Astle et al.
6,940,558 B2 9/2005 Lu et al.
(Continued)

FOREIGN PATENT DOCUMENTS

WO 2012/139240 A1 10/2012

OTHER PUBLICATIONS

PCT Search Report & Written Opinion, Re: Application #PCT/US2014/022167; dated Jul. 10, 2014.
(Continued)

*Primary Examiner* — Abbas Abdulselam
(74) *Attorney, Agent, or Firm* — Stewart M. Wiener

(57) ABSTRACT

In one embodiment, a method detects a user input for a telestration on an image being displayed on a display device and determines a plurality of image portions of the image based on the telestration. The plurality of image portions are determined by a boundary around each image portion based on the telestration. The method then determines a set of tags for the plurality of image portions. The set of tags are determined based on image recognition of content in the plurality of image portions. An operator is determined based on the telestration where the operator characterizes an operation to perform for the plurality of image portions. The method determines a search query based on applying the operator to the set of tags and causes a search to be performed using the search query.

20 Claims, 12 Drawing Sheets

(56) References Cited

U.S. PATENT DOCUMENTS

| | | |
|---|---|---|
| 7,240,075 B1 * | 7/2007 | Nemirofsky et al. |
| 7,565,680 B1 | 7/2009 | Asmussen |
| 7,735,101 B2 | 6/2010 | Lanza et al. |
| 7,925,663 B2 * | 4/2011 | Napper et al. ............... 707/769 |
| 7,928,976 B2 | 4/2011 | Meier et al. |
| 8,255,798 B2 | 8/2012 | Ording |
| 8,255,955 B1 | 8/2012 | Wong |
| 8,478,035 B2 * | 7/2013 | Fowler ......................... 382/165 |
| 8,850,320 B2 * | 9/2014 | Taylor ........................... 715/730 |
| 2008/0294694 A1 | 11/2008 | Maghfourian et al. |
| 2010/0260426 A1 | 10/2010 | Huang et al. |
| 2011/0107238 A1 | 5/2011 | Liu et al. |
| 2012/0044153 A1 | 2/2012 | Arrasvuori et al. |
| 2012/0044179 A1 | 2/2012 | Hudson |

OTHER PUBLICATIONS

D. Goldman, et al., "Interactive Video Object Annotation", Apr. 1, 2007.

N. Narasimhan et al., "TV Clips: using social bookmarking for content discovery in a fragmented TV ecosystem," Proceedings of the 8th International Conference on Mobile and Ubiquitous Multimedia (MUM '09). ACM, New York, NY, USA, Article No. 13, 8 pages. DOI=10.1145/1658550.1658563. Nov. 2009.

N. Narasimhan et al., "CollecTV intelligence: A 3-screen 'social search'system for TV and video queries." 2010 6th International Conference on Collaborative Computing: Networking, Applications and Worksharing (CollaborateCom), IEEE, Oct. 2010.

* cited by examiner

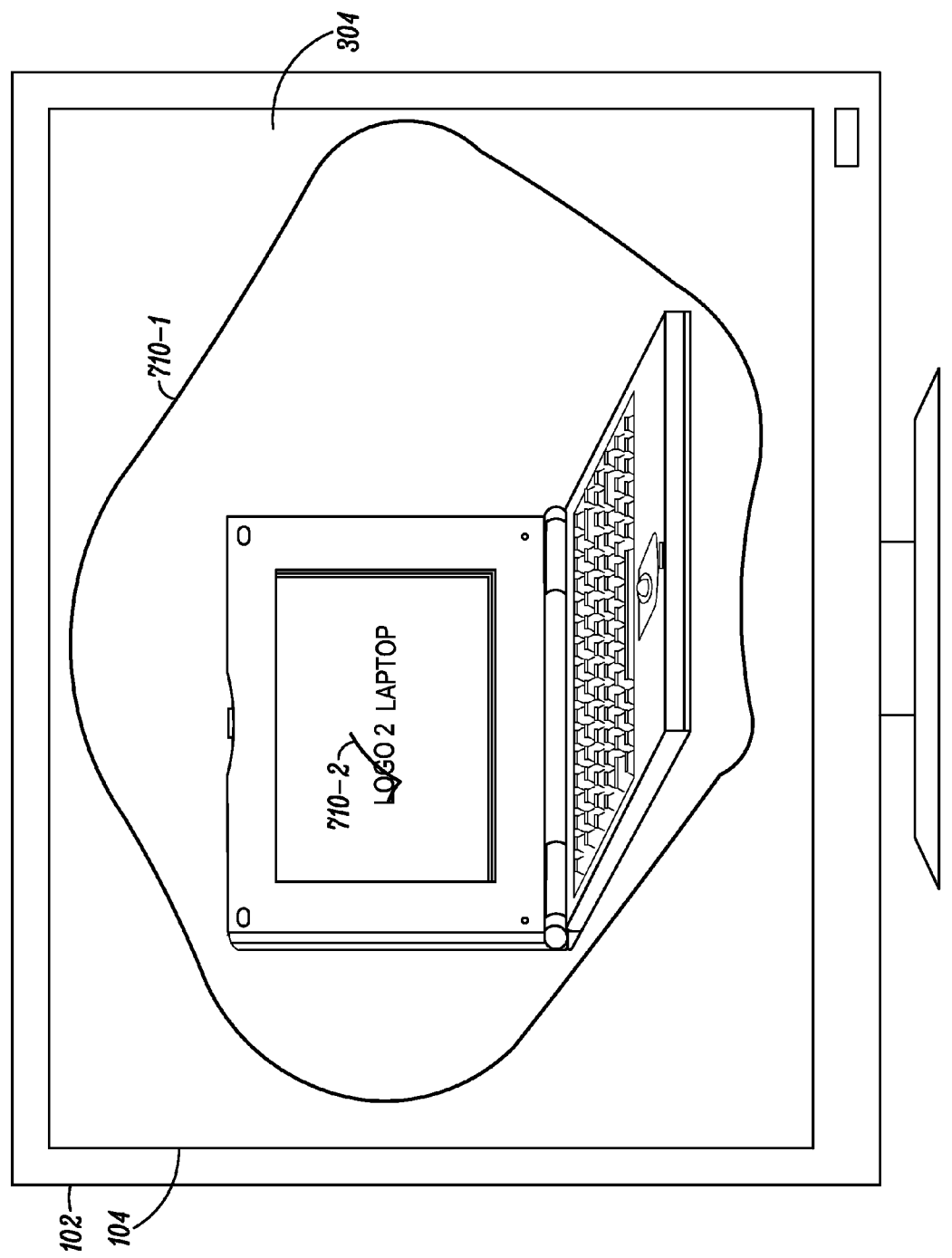

TELESTRATION SYSTEM FOR COMMAND PROCESSING

BACKGROUND

Broadcast companies may use telestrator systems to enhance the viewing experience for users watching video on various devices. For example, a user may be watching a football game that is being broadcast to a television. During the broadcast, announcers describe the events that occur during the football game. To help the user understand the events, an announcer may use a telestrator system to annotate video during the broadcast of the football game. For example, the announcer uses the telestrator system to circle certain players or illustrate how a play occurred. This may help the user to better understand what is occurring in the video. The telestrator system is part of a broadcasting system that delivers video to the user and is not accessible to the user. Thus, the telestrations are sent with the video to the user.

In another example, a user may interact with a document displayed on a computing device. The web page displays specific links or images that a user can select. By selecting one of the links or images, the user may be shown more information, such as selecting a link may cause another web page to be displayed. However, selecting the image may only show a larger version of the same image. Although a user can access more information using the links or images, this type of interaction limits the ability of the user to receive additional information. For example, the links are hard-coded and the user is restricted in receiving only a web page that is associated with the link, or if a picture is selected, only a larger image is displayed.

BRIEF DESCRIPTION OF THE DRAWINGS

FIG. 7B shows a second example for showing intent using telestration according to one embodiment.

DETAILED DESCRIPTION

Figure 1:
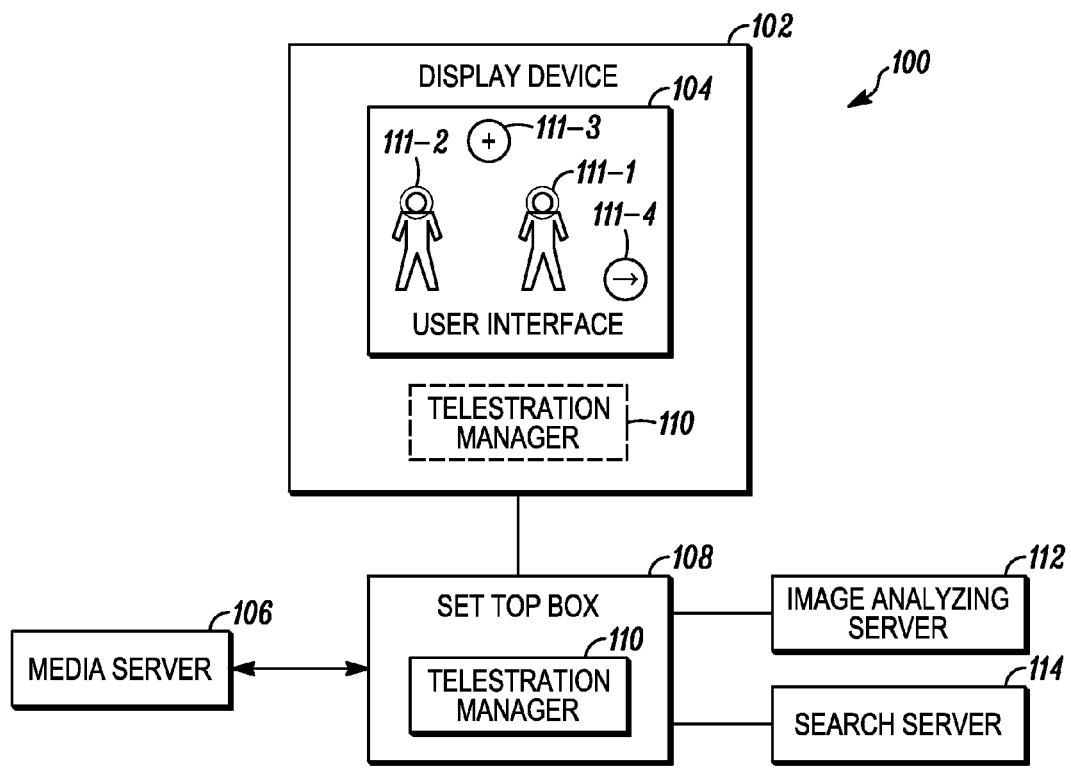
FIG. 1 depicts a simplified system for a telestration user interface according to one embodiment.

Described herein are techniques for a telestration system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method detects a user input for a telestration on an image being displayed on a display device and determines a plurality of image portions of the image based on the telestration. The plurality of image portions are determined by a boundary around each image portion based on the telestration. The method then determines a set of tags for the plurality of image portions. The set of tags are determined based on image recognition of content in the plurality of image portions. An operator is determined based on the telestration where the operator characterizes an operation to perform for the plurality of image portions. The method determines a search query based on applying the operator to the set of tags and causes a search to be performed using the search query.

In one embodiment, a method includes: detecting, by a computing device, a first user input for a first telestration for a first image portion; determining, by the computing device, a first boundary around the first image portion based on the first telestration; detecting, by the computing device, a second user input for a second telestration for a second image portion; determining, by the computing device, a second boundary around the second image portion based on the second telestration; determining, by the computing device, an operator for the first telestration and the second telestration, wherein the operator characterizes an operation to perform for the first image portion and the second image portion; detecting, by the computing device, a third telestration for a command; and determining, by the computing device, an action to perform with respect to the first telestration, the second telestration, or the operator.

In one embodiment, an apparatus includes: one or more computer processors; and a non-transitory computer-readable storage medium comprising instructions that, when executed, control the one or more computer processors to be configured for: detecting a user input for a telestration on an image being displayed on a display device; determining a plurality of image portions of the image based on the telestration, wherein the plurality of image portions are determined by a boundary around each image portion based on the telestration; determining a set of tags for the plurality of image portions, wherein the set of tags are determined based on image recognition of content in the plurality of image portions; determining an operator based on the telestration, wherein the operator characterizes an operation to perform for the plurality of image portions; determining a search query based on applying the operator to the set of tags; and causing a search to be performed using the search query.

FIG. 1 depicts a simplified system 100 for a telestration system according to one embodiment. System 100 includes a display device 102 that displays media on a user interface (UI) 104. Display device 102 may include various computing devices, such as televisions, smartphones, tablet devices, laptop computers, personal computers, and wearable computing devices. A media server 106 may communicate media that is displayed on user interface 104. For example, the media may include video, webpages, images, or other content. The video may include live broadcasts, such as television and movies, that are broadcast from a media company, such as a cable company or a streaming media company. Although media server 106 is shown, other examples of media delivery infrastructures will be appreciated. Additionally, the media may be streamed from a local device, such as a local storage drive. For example, a movie stored on a local computer may be displayed on user interface 104.

In one embodiment, the media may be displayed on user interface 104 via a computing device, such as a set top box 108. For example, set top box 108 receives the media from media server 106 and displays the media on user interface 104. In other embodiments, set top box 108 may not be used and media server 106 may send media to display device 102, which displays the media on user interface 104. Various implementations of sending media for display on user interface 104 will be appreciated.

While the media is displayed on user interface 104, particular embodiments allow telestrating of an image of the media displayed on user interface 104. For example, the media may include a document, such as a webpage, image, or a textual document. In one example, a picture, such as a joint photographic experts group (.jpeg) image may be used. Also, a video may be paused such that user interface 104 displays a static image. Then, user input may be received to telestrate portions of the static image displayed on user interface 104. Although a static image is described, the media may be telestrated as the media is being dynamically displayed. For example, as a scene in a movie is occurring, user input is received to circle an actor being displayed. However, for discussion purposes, a static image is described. In this case, the movie is paused, and the actor is circled on an image displayed.

At 111-1-111-4, user interface 104 displays different telestrations. These telestrations may be different graphical marks, such as lines, dotted lines, highlighting, shading, and various other markings, that are displayed on user interface 104 based on user input. The telestrations may also be in different shapes. For example, the telestration may be similar to a circle or oval. However, other shapes may be used, such as lines, check marks, squares, etc.

In one embodiment, telestration manager 110 interprets the telestrations on user interface 104, generates a search query, and causes a search to be performed. Telestration manager 110 generates a search query based on performing image recognition on image portions of the image. Image recognition is used to determine the content of the image, and allows users to use telestration to have a search performed instead of having to type in a search query. This process will be described in more detail below. Telestration manager 110 may be located in different entities. For example, telestration manager 110 may be located in display device 102 or set top box 108, and in other embodiments, telestration manager 110 may be associated with other devices, such as in a remote server connected to a network that is coupled to display device 102 or set top box 108.

Particular embodiments may receive different types of telestrations. For example, telestrations may include bounding telestrations, operators, and commands. A bounding telestration, such as shown at 111-1 and 111-2, identifies a region within the image. For example, a user may circle various actors' faces. A telestration manager 110 analyzes the telestrations to determine a boundary that defines the region of the image, such as a boundary around the actors' faces. For example, the telestration may form a complete boundary around the actor's face, such as the telestration is a complete circle. In other examples, the boundary may not form a complete connected boundary (e.g., the boundary may include gaps). For example, an incomplete circle is drawn; however, telestration manager 110 can interpolate or calculate an estimated boundary based on the incomplete circle. Further, telestration manager 110 may also generate a boundary, such as a user may draw a line through an actor's face and then telestration manager 110 determines a boundary (e.g., a circle or a rectangular bounding box) by determining a circle around the actor's face using the line drawn as a radius or diameter of the circle.

A second type of telestration may be an operator that is shown at 111-3. Operators characterize an operation to perform for the image portions. For example, the operator may be a Boolean or arithmetic operator, such as AND, NOT, OR, SIMILAR TO, SUM, SUBTRACT, etc. The term operator, as used herein, does not include a person who is the operator of a device.

A third type of telestration may be a command that is shown at 111-4. Commands indicate instructions to telestration manager 108 to perform an action. For example, the command may cause telestration manager 108 to perform some action with respect to the operators and bounding telestrations. One command may be a search command, which causes a search to be performed. Other command may be a "backspace" command that clears the last telestration, a "Clear command" that erases all of the telestration marks and associated buffers, a "Count" command that counts the number of users or letters in a certain image, a "Post" command that posts information, such as the telestrated images and text, to a website, such as a social networking website.

Telestration manager 110 uses the telestrations to form a search query using the operators and the image portions. For example, one search query may be where a user desires to search for more information on two actors shown in an image of a video. Accordingly, by using telestration, a user can cause a search to be performed by circling Actor #1, circling Actor #2, and drawing an AND operator on user interface 104. In this case, telestration manager 110 interprets the telestrations to form a search query for "Actor #1" AND "Actor #2". Particular embodiments could perform a search for movies that include both Actor #1 and Actor #2. By allowing a user to telestrate user interface 104, a user may easily determine additional information about an image shown. The portions of the image that are telestrated do not need to be associated with links or be selectable. As will be described in more detail below, particular embodiments use image recognition to determine the search query. Additionally, the user did not have to go to a second computing device to perform the search, such as having to manually type in the search query on a personal computer.

The determining of the search query may be a multiple step process. For example, telestration manager 110 detects a user input for a telestration on user interface 104. As discussed above, the telestration may form a circle around multiple actors' faces. Telestration manager 110 may capture an image portion based on the boundary formed by each telestration at 111-1 and 111-2, respectively. For example, an image portion includes Actor #1's face and an image portion includes Actor #2's face. Telestration manager 110 may then determine via image recognition a set of tags that characterize the image portions. In one example, telestration manager 110 communicates via a network (not shown), such as a wide area network (WAN), with an image analyzing server 112 to have the image recognition performed. In other embodiments, telestration manager 110 may perform the image recognition locally. As will be described in more detail below, image recognition may include object recognition (e.g., recognizing a specific object in the image portion, such as an actor or a landmark) or text recognition to determine the set of tags that describe the image portions. Particular embodiments perform image recognition because the image portion may not include links to other information. Also, no metadata may be available to identify the content of the image portion. However, if metadata is available, particular embodiments may leverage the metadata, such as source code, to perform the image recognition. However, in some embodiments, metadata is not available, such as when a television broadcast is being telestrated.

The set of tags may be different types of information. For example, if the faces of Actor #1 and Actor #2 were circled, image analyzing server 112 may determine the names of Actor #1 and Actor #2 and return the set of tags as "Actor #1 name" and "Actor #2 name". In another example, if an image of text was circled, image analyzing server 112 may return the text.

Telestration manager 110 may also detect when a telestration includes an operator. In one embodiment, the operator may be displayed on user interface 104. In this case, telestration manager 110 analyzes the mark and determines when the mark is directed to an operator, object, or a command. For example, telestration manager 110 analyzes the mark to determine the intent, which could be the type of operation that the user desires. In one example, the user may telestrate a plus "+" sign if the operator of "AND" is desired. In other examples, telestration manager 110 may infer the operator through a received gesture, such as the user may perform a swipe or perform another gesture for the operator. In one example, telestration manager 110 may receive a swipe bringing four fingers together in a gesture and infer the ADD operator. In other examples, telestration manager 110 may infer the operator based on analysis of other telestrations on user interface 104, such as if two circles are telestrated on user interface 104, telestration manager 110 uses an operator of "OR" unless another operator is specified.

At some point, telestration manager 110 may determine a search should be performed. For example, a user may telestrate the submit operation, such as an "arrow" telestration mark (111-4), to indicate that a search should be performed. Other telestrations may also be used, such as the word "submit", or gestures may be used, such as a swipe to the right. Once determining the submit operation, telestration manager 110 then determines a search query based on the set of tags and the operator. For example, the search query may be "Actor #1's name" AND "Actor #2's name". This may search for information that includes both Actor #1's name and Actor #2's name. In one example, movies that include both actors may be searched for in a movie database. In other examples, telestration manager 110 may perform the search automatically without receiving the submit command. For example, telestration manager 110 performs a real-time search while telestrations are being received. That is, when telestration manager 110 receives Actor #1's name, search results for Actor #1 are returned, then when telestration manager 110 receives Actor #2's name and the AND operator, the search results are updated to show results that include both Actor #1 and Actor #2.

To perform the search, telestration manager 110 may communicate with an external search service to have the search performed. In other embodiments, telestration manager 110 may locally perform the search, such as telestration manager 110 may search through a user's local storage. When the external search service is used, telestration manager 110 communicates the search query to search server 114. Search server 114 then can perform the search to determine a search result. In this example, telestration manager 110 may use a search engine to have the search performed. Telestration manager 110 receives the search result from search server 114 and can then output the search result to a user. The search process will be described in more detail below.

Figure 2:
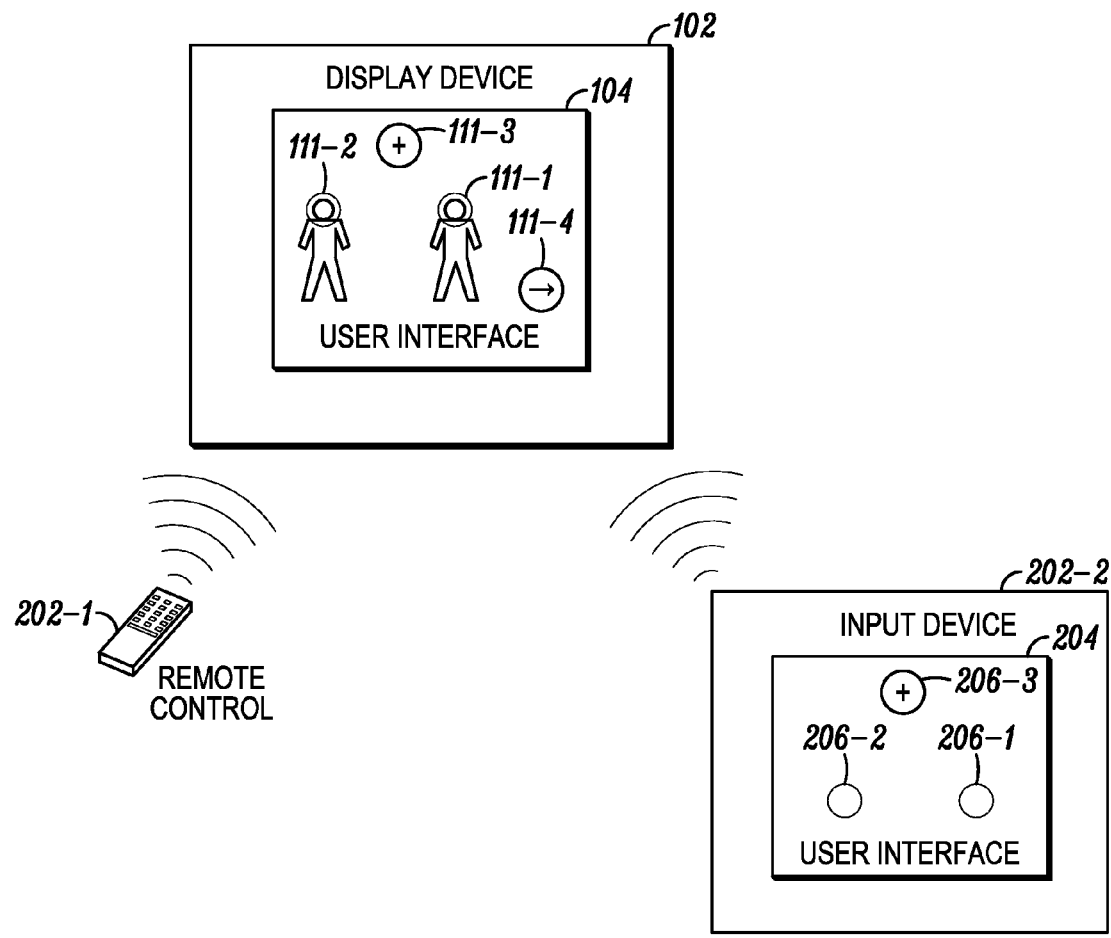
FIG. 2 depicts examples of methods for telestrating the user interface according to one embodiment.

A user input for the telestration may be received using various methods. FIG. 2 depicts examples of methods for telestrating user interface 104 according to one embodiment. In one embodiment, user interface 104 may include a touch screen in which a user can telestrate user interface 104 by physically touching the screen of display device 102. For example, if the user is viewing the media on a tablet device, the user may telestrate the image using the user's finger, stylus, or other input device. Further, motion detection systems that can detect gestures may be used to input telestrations.

In other examples, display device 102 may not be a touch screen-enabled device or a user may not be situated close enough to physically touch the screen of display device 102. For example, a user may be watching a television show on a television from a distance where it may be inconvenient for the user to walk to the television to touch the screen of the television (i.e., if the television had a touch-enabled user interface). In this case, a user may use an input device to input the telestrations on user interface 104. For example, an input device 202-1 may be a remote control that can be a pointer that is moved to input the telestrations on user interface 104. The remote control may be an infrared (IR), radio frequency (RF), Bluetooth, or other type of communication device. For example, if an IR pointer is used, a user may point the IR pointer at user interface 104 and form the desired telestrations on user interface 104, such as drawing a circle using the pointer. Also, a remote that uses a tracking sensor may be used.

In another embodiment, an input device 202-2 may receive user input for the telestrations from a user. Those telestrations may then be duplicated onto user interface 104. For example, input device 202-2 may be a tablet device or remote control that includes a touch-enabled user interface 204. User interface 204 may be synched with user interface 104, such as when a telestration is received on user interface 204, a corresponding location on user interface 104 is telestrated. In one example, a circle received on user interface 204 at 206-1 translates into a circle telestrated on user interface 104 at 111-1. Similarly, telestration marks at 206-2 and 206-3 on user interface 204 translate into telestration marks at 111-2 and 111-3, respectively, on user interface 104. Although the above examples are described, other examples of receiving user input for a telestration may be appreciated, such as a laptop or personal computer may be used where a mouse input is received to telestrate user interface 104.

As briefly discussed above, various telestrations may be received from a user. The following will describe certain telestrations that can be received and resulting searches that can be derived from the telestrations. However, although these telestrations and searches are described, other telestrations and searches may be appreciated.

Figure 3:
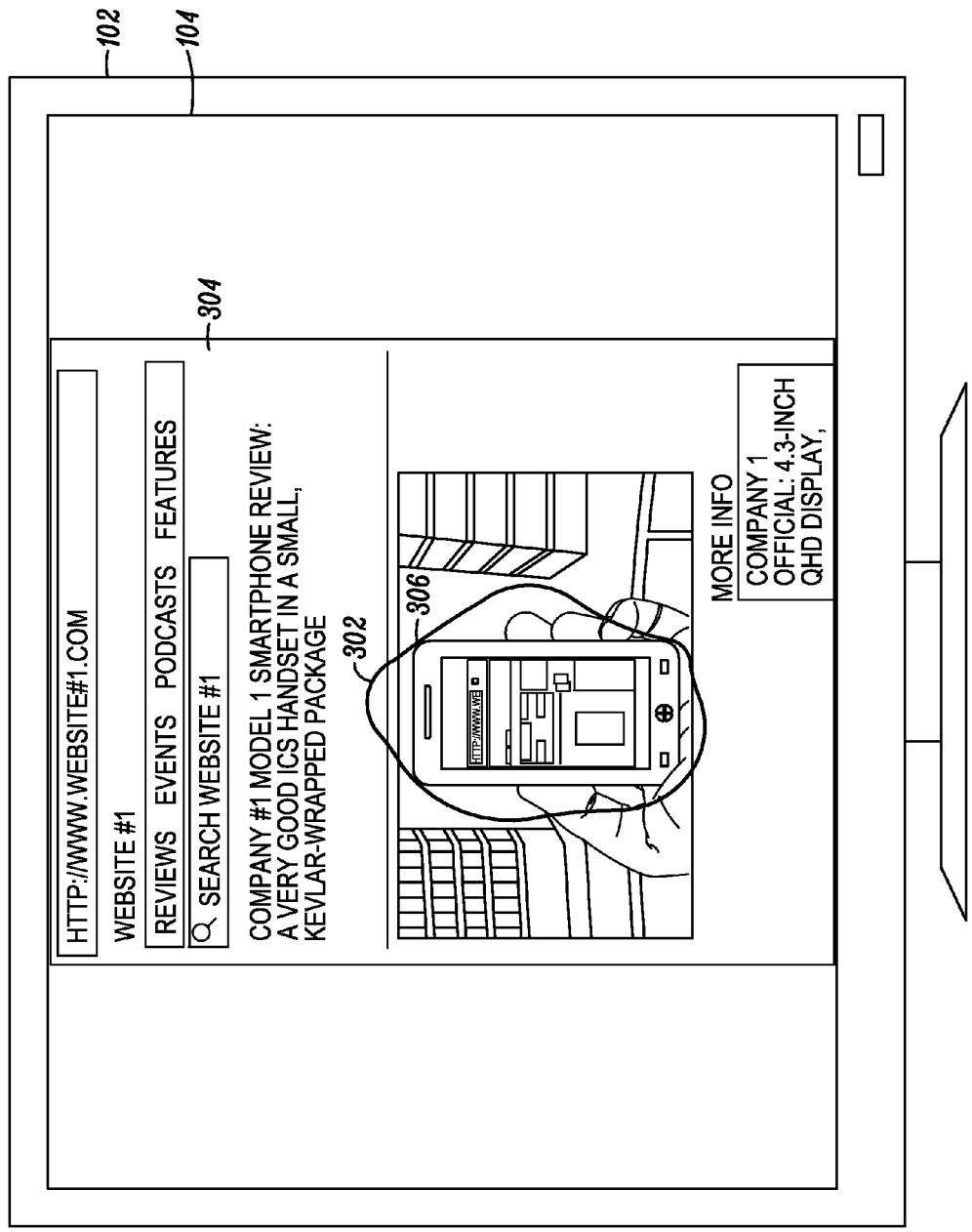
FIG. 3 depicts an example of a first telestration according to one embodiment.

FIG. 3 depicts an example of a first telestration according to one embodiment. In this example, a telestration shown at 302 is displayed on an image 304 displayed on user interface 104 of display device 102. In this case, display device 102 may be a television, but may also be a tablet computer, computer monitor, or smartphone. The image being displayed may be a jpeg image, a web page, but may also be video or a guide for the TV (e.g., cable TV guide).

In image 304, a user may see an item of interest shown at 306. For example, the item of interest may be a smartphone that is being described in an article on the web page. In another example, a video may display an image of a smartphone and the video is paused to display image 304. A user input is then received to telestrate image 304 to mark the smartphone. For example, as shown at 302, a telestration of a circle forms a boundary around the smartphone. Telestration manager 110 may then capture an image portion, such as a snippet, of image 304. For example, the image portion may be determined from within the boundary formed by the circle shown at 302.

As will be described in more detail below, image analyzing server 112 may analyze the image portion using image recognition to determine that a smartphone of a certain brand is found in the image portion. Image analyzing server 112 determines a set of tags that describe the smartphone.

Figure 4:
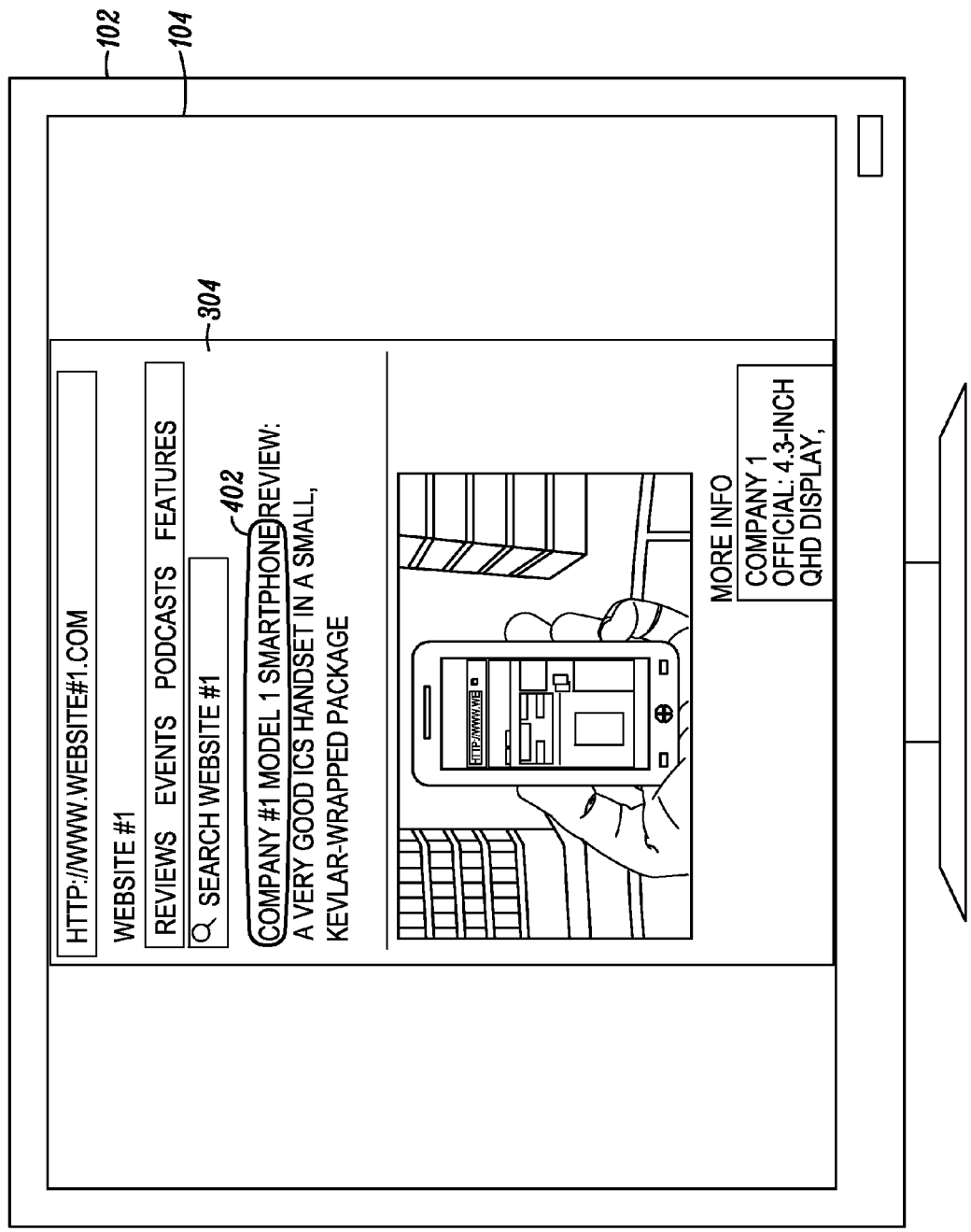
FIG. 4 shows a second example of a telestration according to one embodiment.

A user may also telestrate other information shown on image 304. For example, FIG. 4 shows a second example of a telestration according to one embodiment. At 402, a telestration of text is shown. In this case, a user may have telestrated the text of "Company #1's model #1 smartphone". This may be the model name of a company's smartphone. The text may be an image of text (e.g., text not linked to any other information).

Telestration manager 110 may then capture an image portion based on the telestration shown at 402. For example, the image portion may include the text within the boundary formed by the telestration. As will be described in more detail below, text recognition, such as optical character recognition (OCR), may be used to recognize text in the image. The recognized text may be returned as a search tag of the company name or model name of the smartphone. The search tags may then be used in a search.

Figure 5:
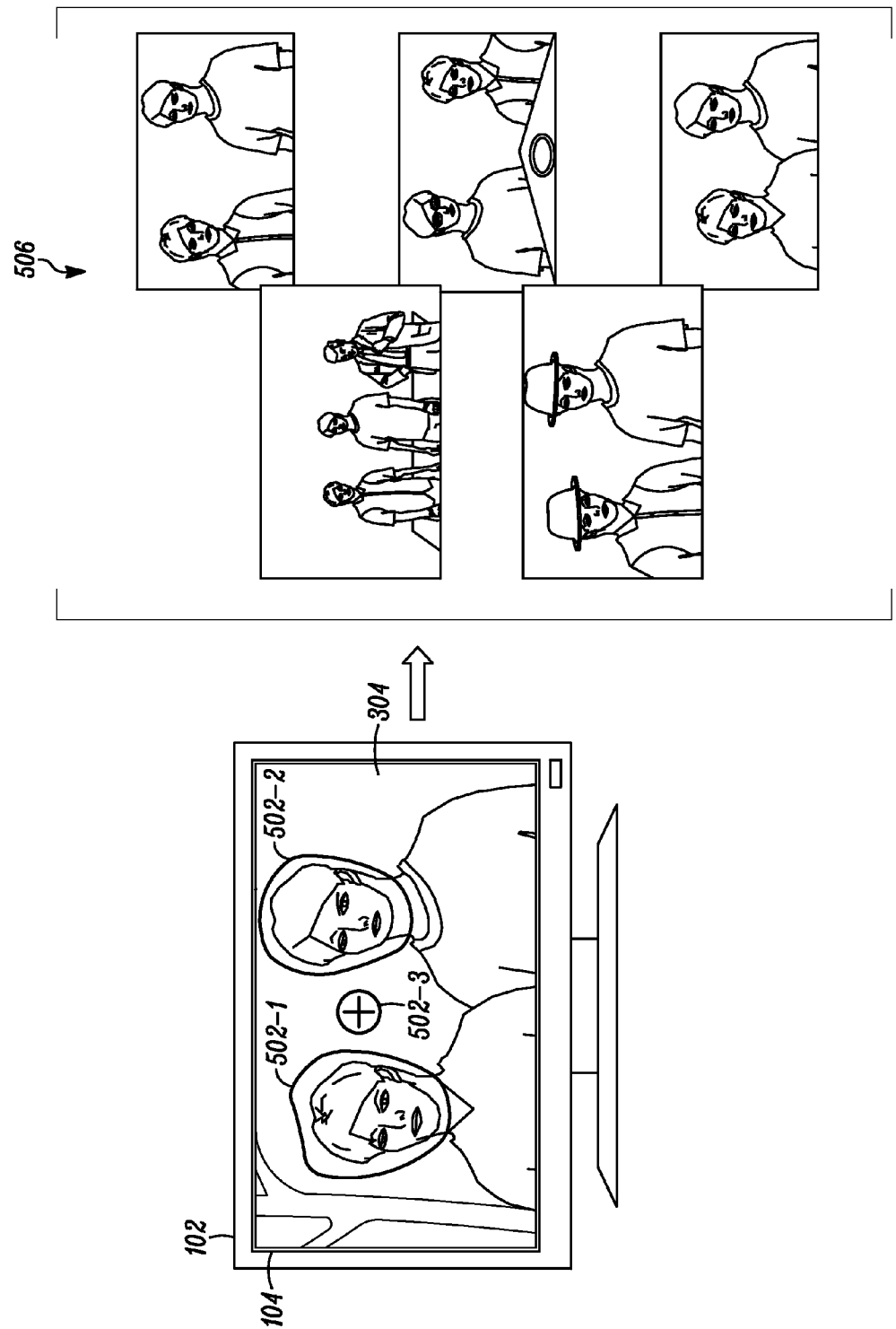
FIG. 5 depicts an example of telestrating multiple objects according to one embodiment.

When multiple image portions are telestrated on an image 304, telestration manager 110 may generate a search query based on an operator. FIG. 5 depicts an example of telestrating multiple objects according to one embodiment. At 502-1, a first object has been telestrated, and at 502-2, a second object has been telestrated. For example, image 304 may display two actors, Actor #1 and Actor #2. The telestration shown at 502-1 may form a boundary around the Actor #1's face (or body). Although the face is described, other information may be telestrated that may be used to identify Actor #1. For example, if a movie's credits are being shown, the actor's name in the credits may be telestrated. Also, the telestration shown at 502-2 forms a boundary around Actor #2's face. Thus, telestration manager 110 may capture multiple image portions including the faces of Actor #1 and Actor #2.

An operator is also shown at 502-3. The operator characterizes an operation to be performed for the telestrations at 502-1 and 502-2. In this case, telestration manager 110 analyzes the mark and determines the telestration of an addition sign and a circle around the addition sign signals a user intent of an AND operator.

When image recognition is performed, the search tags may be a name of Actor #1—"Actor #1 name" and a name of Actor #2—"Actor #2 name" with an operator of "AND". Telestration manager 110 may then generate a search query for "Actor #1 name" AND "Actor #2 name" when a submit command is received. Thus, search server 114 may perform a search for information that includes both Actor #1's name and Actor #2's name. For example, at 506, a search result of images that include both Actor #1 and Actor #2 is shown. The search results may be images, shows, and movies, or websites that include both Actor #1 and Actor #2. The search results may be further linked to other information, such as when a user input selecting one of the images is received, then a movie associated with that image may begin to play.

Figure 6:
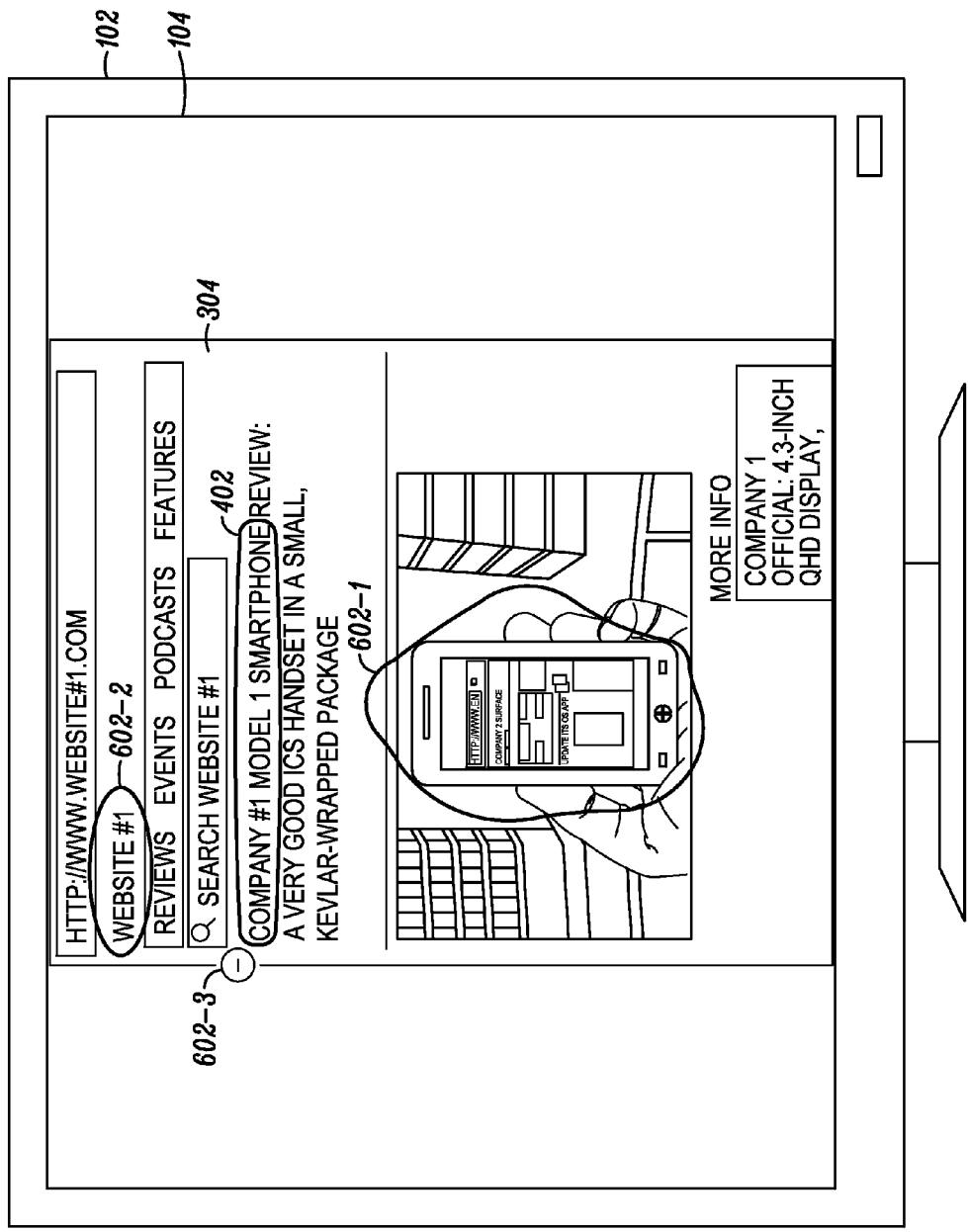
FIG. 6 shows another example for telestrating an image using logical operators and a context according to one embodiment.

Particular embodiments may also derive a context from the telestrations. Telestration manager 110 may use the context to derive the search query. FIG. 6 shows another example for telestrating image 304 using logical operators and a context according to one embodiment. A first telestration of an object is shown at 602-1. For example, the telestration may form a boundary around an object, such as a smartphone that is made by a certain manufacturer. A second telestration shown at 602-2 may form a boundary around text displayed in image 304. For example, the text may identify the website name of "Website #1" in which the smartphone is displayed. Then, an operator shown at 602-3 is positioned nearest to the telestration shown at 602-2.

Particular embodiments may then determine a context for the operator. For example, the context may be based on the proximity of the operator to one of the telestrations. In this example, telestration manager 110 determines that the operator is nearest to the telestration at 602-2. The operator is a "NOT" operation and telestration manager 110 assigns the NOT operation to the image portion including the text of "Website #1". In one embodiment, a search query may be "Company #1's smartphone", but "NOT" from "Website #1". In this case, a user wants to search for the smartphone in image 304, but not in webpages associated with Website #1. For example, webpages by a Website #2 that depict or describe Company #1's smartphone may be returned as a search result. In another example, when the NOT operator is applied to the telestrations in FIG. 5, the search may be "Actor #1 name", but "NOT" "Actor #2 name". In this case, the search query may have returned a search result that includes images with Actor #1 without Actor #2.

Figure 7A:
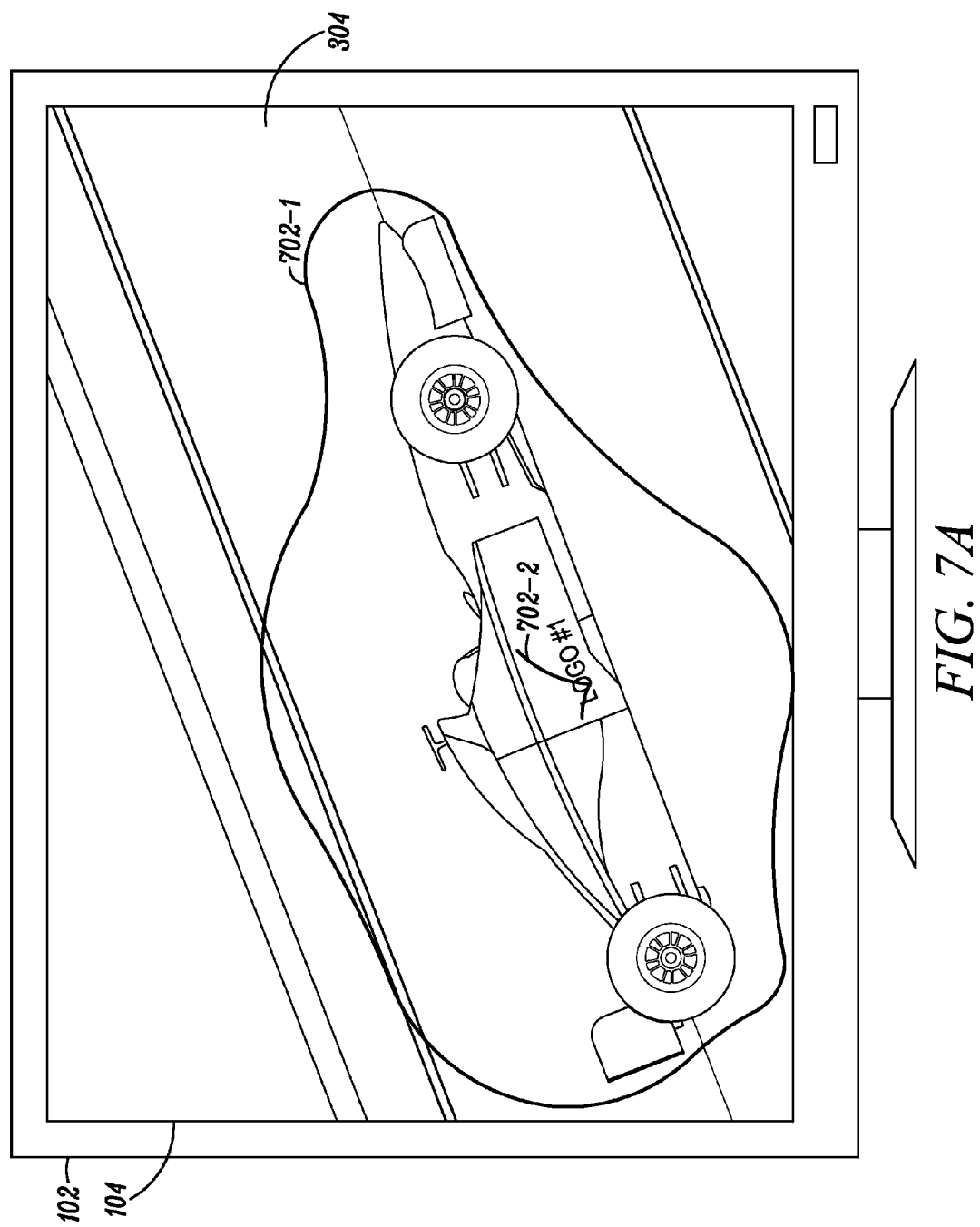
FIG. 7A shows an example of deriving context from a telestration according to one embodiment.

Although the above context is described using distance, other contexts may be derived from the operator. For example, a user input may connect an operator and a telestration of an image portion by drawing a line from the operator to the telestration of the image portion. Also, a user may use a gesture over one of the telestrations shown at 602-1 or 602-2 to indicate the operator is assigned to that telestration. Context may also be used with respect to commands. For example, placing the submit command near the border of the screen indicates that the results of the command should be sent to a cell phone, as opposed to displayed on display device 102. Other examples are also shown in FIGS. 7A and 7B. FIG. 7A shows an example of deriving context from a telestration according to one embodiment. A first telestration is shown at 702-1 on an image 304. For example, a user may have been watching a live car race and paused the broadcast to display an image of one car. A user may then want to learn more about the racing car, but wants to know only about racing cars sponsored by a company shown in a logo, "Logo #1".

The user may use a telestration to indicate the above intention. For example, user input is received that forms a boundary around a Formula 1 racing car shown in a telestration at 702-1. However, the user may be interested in Formula 1 racing cars that are sponsored by a company that is identified by a "Logo #1" on the Formula 1 racing car pictured in image 304. In this case, an intent may be derived from a telestration from a user by a user placing a second telestration mark in user interface 104. For example, a telestration shown at 702-2 indicates the user's intention to emphasize Logo #1. In this case, telestration manager 110 may determine that the checkmark is an operator with the intent to search for Formula 1 race cars associated with a company pictured in Logo #1. Accordingly, users can indicate additional intent by providing other telestrations in which an intent is determined.

To show the intention, the user may have put a checkmark over logo #1. Other examples of telestration marks may also be used, such as a circle around logo #1, or a line through logo #1. In one example, the checkmark may form a boundary around logo #1 in which an image portion is captured. That is, telestration manager 110 uses the check mark to form a radius or diameter for a circle. Additionally, telestration manager 110 may use the telestration to infer an operator. For example, the checkmark indicates an "AND" operator. In this case, the search query may be "formula 1 racing car", AND "Logo #1".

FIG. 7B shows a second example for showing intent using telestration according to one embodiment. In a telestration shown at 710-1, a laptop computer has been circled by the telestration. However, a user may only be interested in a certain type of laptop. For example, the user may not be interested in a general search for laptops, but a search for laptops of a certain manufacturer. To indicate the intent to perform a search for a certain manufacturer, a second telestration is received as shown at 710-2, and forms a boundary around a "Logo #2". Telestration manager 110 interprets this mark as having an intent of refining the image portion shown at 710-1. For example, this telestration indicates that a company associated with a logo, "Logo #2", is desired. In this case, a search query may search for laptop computers made by the company associated with Logo #2.

Other examples of telestrations may also be appreciated. For example, Actor #1's face may be circled, Actor #2's face may be circled, and then a search may be submitted. In this case, an operator may not be received, but an implicit "OR" is assumed. Other examples may be an image of an individual standing in front of a landmark (e.g., the Eiffel Tower) where the individual and the landmark are circled. A search for Eiffel Tower and the individual is then performed. In another example, arithmetic operations may be performed. For example, two sets of objects could be telestrated and the arithmetic operation would add both sets of objects to return the total sum of the objects in the telestrated areas. In one example, a calculator may be provided where a user could telestrate numbers and operators. Also, a crowd of people may be circled, and a command to count the number of people may be input.

Figure 8:
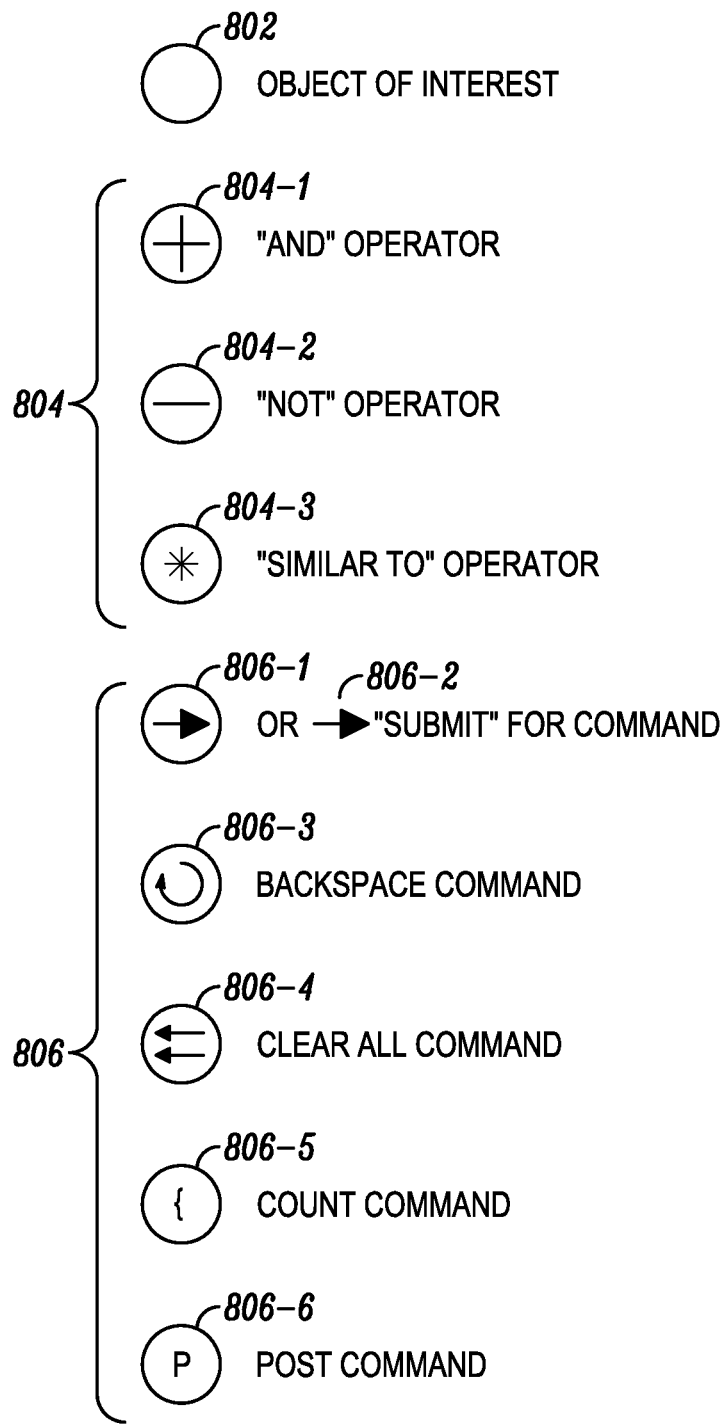
FIG. 8 shows an example of different telestration marks according to one embodiment.

Some telestration marks and operators have been described above, but others may be appreciated. FIG. 8 shows an example of different telestration marks according to one embodiment. At 802, a telestration mark indicates an object of interest. For example, the telestration mark at 802 forms a boundary around an object. Although a circle is described, other methods of indicating a boundary may be appreciated, such as using lines or checkmarks.

Telestration marks may also be operators as shown at 804. At 804-1, an "AND" operator is shown. The AND operator may be a circle with a "+" sign inside the circle. It should be noted that other methods of providing an AND operator may be used, such as just a + sign or possibly an ampersand (&) sign. A "NOT" operator is shown at 804-2. The NOT operator may be a minus (−) sign surrounded by a circle. As described above, other iterations of the NOT operator may be used such as only a minus sign or a diagonal slash through an object of interest. An operator shown at 804-3 may be a "SIMILAR TO" operator. The SIMILAR TO operator may determine objects that are similar to an object of interest.

At 806, commands are shown. At 806-1 or 806-2, a SUBMIT command is shown. The SUBMIT command is used to indicate that the telestration has been finished and a search query should be submitted. For example, a user may telestrate multiple objects on an image by circling them, such as a user may circle a first face of a first object and then circle a second face of a second object. Then, the user may input a telestration mark for an operator, such as the AND operator. When the user is finished telestrating, the user may indicate to telestration manager 110 that a search query should be submitted. For example, telestration manager 110 receives the SUBMIT command of an arrow that is circled as shown at 806-1 or just an arrow as shown at 806-2. When the SUBMIT command is received, telestration manager 110 may then determine the search query and submit the search query for processing. Although a telestration mark is shown for a SUBMIT command, other methods of submitting a search query may be used. For example, a gesture to submit a search query for processing may be used, such as a user may provide a gesture by swiping to the left. Also, telestration manager 110 may receive a selection of an input button, such as a physical button or a virtual button, to indicate a search query should be submitted.

At 806-3, a backspace command is shown that clears the last telestration. At 806-4, a clear all command erases all of the telestration marks and associated buffers. At 806-5, a count command counts the number of users or letters in a certain image. At 806-6, a post command posts information, such as the telestrated images and text, to a website. Also, as indicated above, the commands need not be circled.

Figure 9:
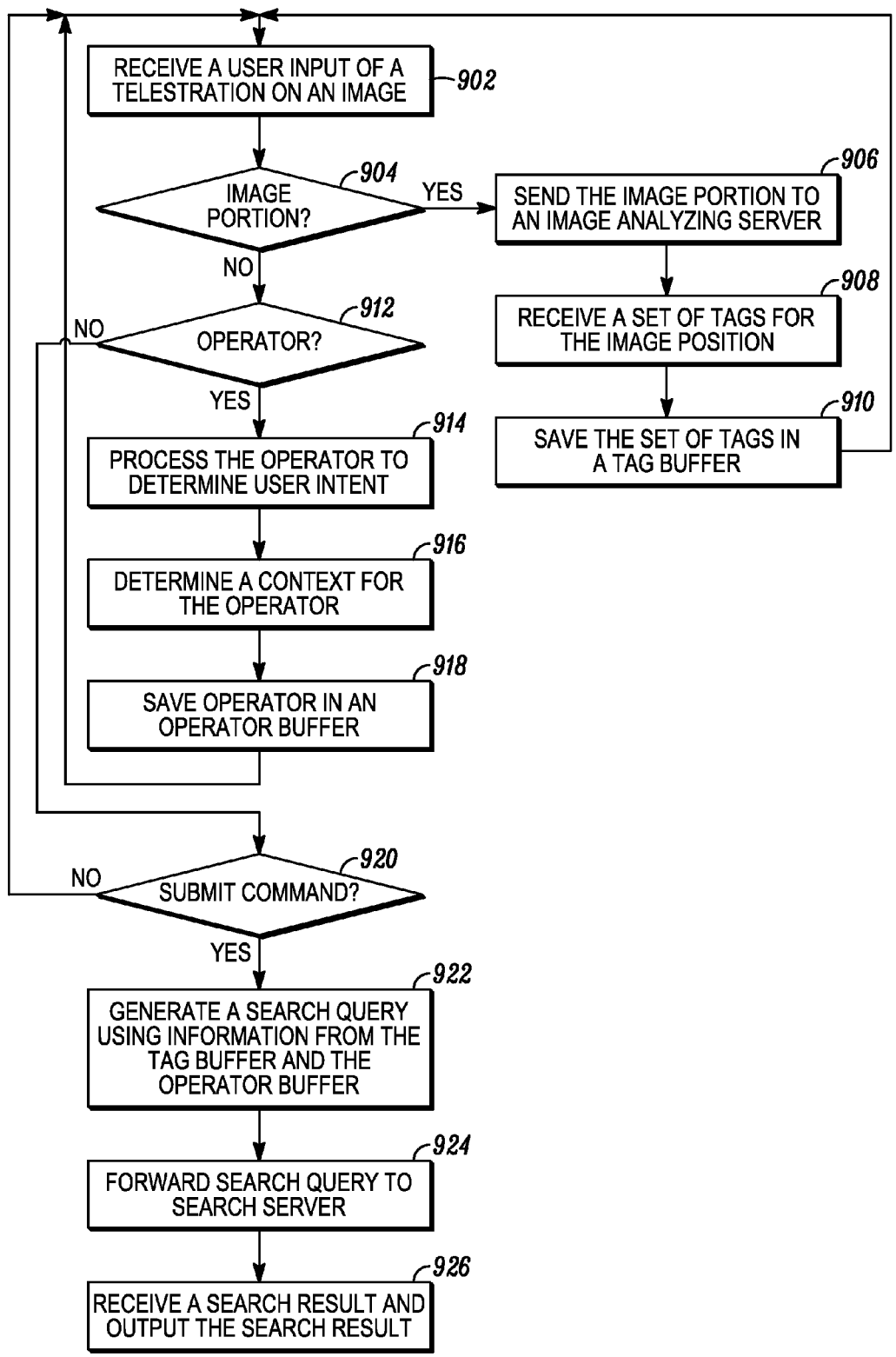
FIG. 9 depicts a simplified flowchart of a method for processing a telestration according to one embodiment.

The overall process for processing a telestration on user interface 104 will now be described in more detail below. FIG. 9 depicts a simplified flowchart 900 of a method for processing a telestration according to one embodiment. At 902, telestration manager 110 receives a user input of a telestration on an image. For example, the user may use any user input method described above to telestrate on an image displayed on user interface 104. At 904, telestration manager 110 determines if the telestration is for an image portion. For example, telestration manager 110 may analyze the telestration mark to determine if it is marking an object in the image, is an operator, or is a submit command. In one example, telestration manager 110 determines if the mark is similar to a type of mark that indicates a boundary around an object, such as a circle, a slash, or a square.

If telestration manager 110 determines that an image portion has been selected, at 906, telestration manager 110 sends the image portion (or portions) to image analyzer server 112. Image analyzer server 112 may then analyze the image portion using image recognition. Image recognition may also include text recognition in which text is recognized. The image recognition may recognize objects in the image portion. For example, the image recognition analyzes an image of a face to determine a name associated with the face.

At 908, telestration manager 110 receives a set of tags for the image portion. For example, image analyzer server 110 may generate a set of tags that describe the text or objects determined from the image recognition. At 910, telestration manager 110 saves the set of tags in an tag buffer. The process then reiterates to 902 where additional telestrations may be received.

If the telestration was not for an image portion, at 912, telestration manager 110 determines if the telestration was for an operator. In determining if the telestration is an operator, telestration manager 110 may analyze the mark (i.e., determine if an addition sign is telestrated). If not, then the process may continue to determine if a command was received. If a command is not received, the process then reiterates to 902. However, if an operator was received, at 914, telestration manager 110 processes the operator to determine user intent. For example, a symbol for the operator may have been received and telestration manager 110 determines the user intent for the symbol. For example, a + sign may indicate that an "AND" operation is desired. Additionally, telestration manager 110 may determine the intent if the operator is placed within an image portion. Also, telestration manager 110 may have image recognition performed to determine if a telestration mark is an operator. At 916, telestration manager 110 determines a context for the operator. For example, as discussed above, the proximity of the operator to an image portion may be determined. The context is used to refine the search query. The interpreted context is also saved for inclusion in the command string. At 918, after the context is determined, telestration manager 110 saves the operator in an operator buffer. The process then reiterates to 902 where additional telestrations may be received.

The above process may continue as the user may telestrate on the image to mark objects using image portions and also provide operators. At some point, a command may be received from the user. At 920, telestration manager 110 determines if a telestrated command is a SUBMIT command. If the SUBMIT command is received, at 922, telestration manager 110 generates a search query using information from the tag buffer and the operator buffer and any saved context. For example, telestration manager 110 uses all search tags and operators in the tag buffer form the search query in addition to any context or intent that was determined. At 924, telestration manager 110 forwards the search query to search server 114. Search server 114 then performs a search using the search query to generate a search result. Then at 926, telestration manager 110 receives the search result and may output the search result to the user.

Figure 10:
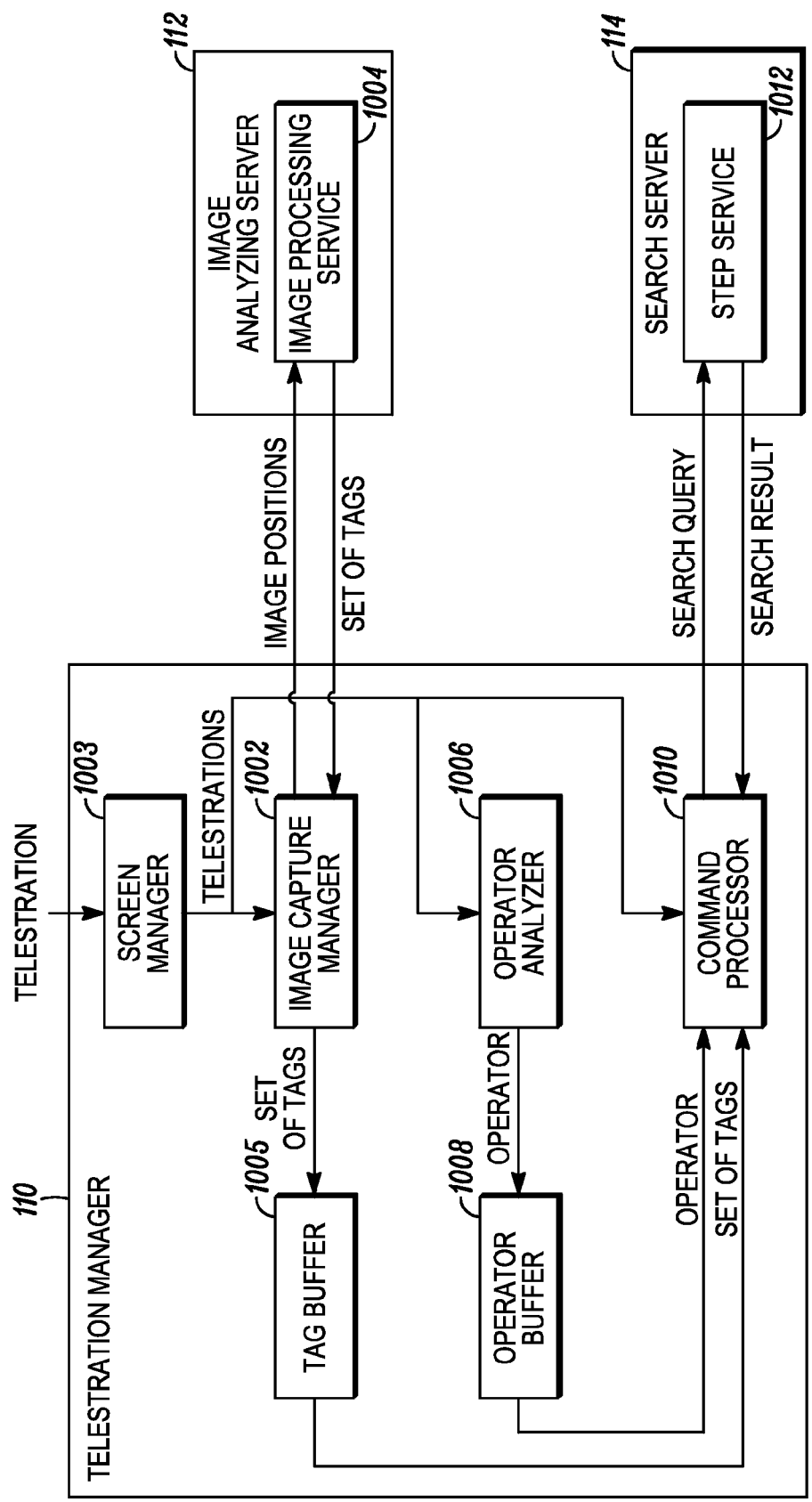
FIG. 10 shows a more detailed example of system according to one embodiment.

FIG. 10 shows a more detailed example of system 100 according to one embodiment. In telestration manager 110, an image capture manager 1002 captures image portions based on telestrations reported by a screen manager 1003 that receives user input for telestrations from user interface 104. Image capture manager 1002 may send the image portions to an image processing service 1004 in image analyzing server 112. Image processing service 1004 may be a web service that can perform image recognition on the image portion to recognize objects and text in the image portion. Image processing service 1004 may then send a set of tags that describes the image portion back to image capture manager 1002. Image capture manager 1002 then stores the set of tags in a tag buffer 1005.

The set of tags that is returned may depend on the success of the image recognition. For example, if image processing service 1004 determines that the object in the image portion was recognized successfully, then only one tag may be returned. If image processing service 1004 can determine the object in the image portion with relative confidence, a larger number of tags may be sent that may include tags that may or may not be relevant to the objects in the image portion. If image processing service 1004 cannot easily identify the object in the image portion, then a larger amount of information may be returned to identify the object in the image portion, such as links related to object in the image portion that can be selected to receive additional information. When image processing service 1004 sends a larger amount of information back, it is possible that tags for other image portions that will be telestrated in the future (or previously) may be used to refine what object was in the image portion. In this case, image processing service 1004 or telestration manager 110 may refine tags that were previously sent. Further, image processing service 1004 may use previously determined tags to help in determining tags for a current image portion. For example, if an Actor #2 appears in a lot of movies with Actor #1, then it may be more likely the image portion shows Actor #2 than an Actor #3 who has not appeared in a lot of movies with Actor #1.

If the telestration is for an operation, then an operator analyzer 1006 may determine the operation in addition to the intent/context for the operator. For example, operator analyzer 1006 determines the intent of the operator and then determines if any context is associated with the operator. In one example, operator analyzer 1006 may analyze the distance of the telestrated operator to other telestrations of objects on user interface 104. Operator analyzer 1006 then stores the operator in an operator buffer 1008. The intent/context may also be stored with the operator.

When telestration manager 110 receives a SUBMIT command, a search processor 1010 determines a search query. For example, search processor 1010 retrieves a set of tags from tag buffer 1005 and an operator (or operator) from operator buffer 1008. Search processor 1010 then generates a search query based on the set of tags and operator. Search processor 1010 may also use the context determined with respect to the operator or command to generate the search query.

Command processor 1010 then sends a search query to a search service 1012 in a search server 114. Search service 1012 may be a search engine, recommendation engine, or other search query processor. Search service 1012 then determines a search result and returns the search result to search processor 1010. Search processor 1010 may output the search result to the user.

Accordingly, users can telestrate an image shown on a user interface 104 to receive additional information about the image. The telestration allows a user to determine information that is not linked to other information. For example, image recognition is used to identify objects that have been telestrated. Thus, a richer search is provided when a user uses operators that can be used to form a search query.

Figure 11:
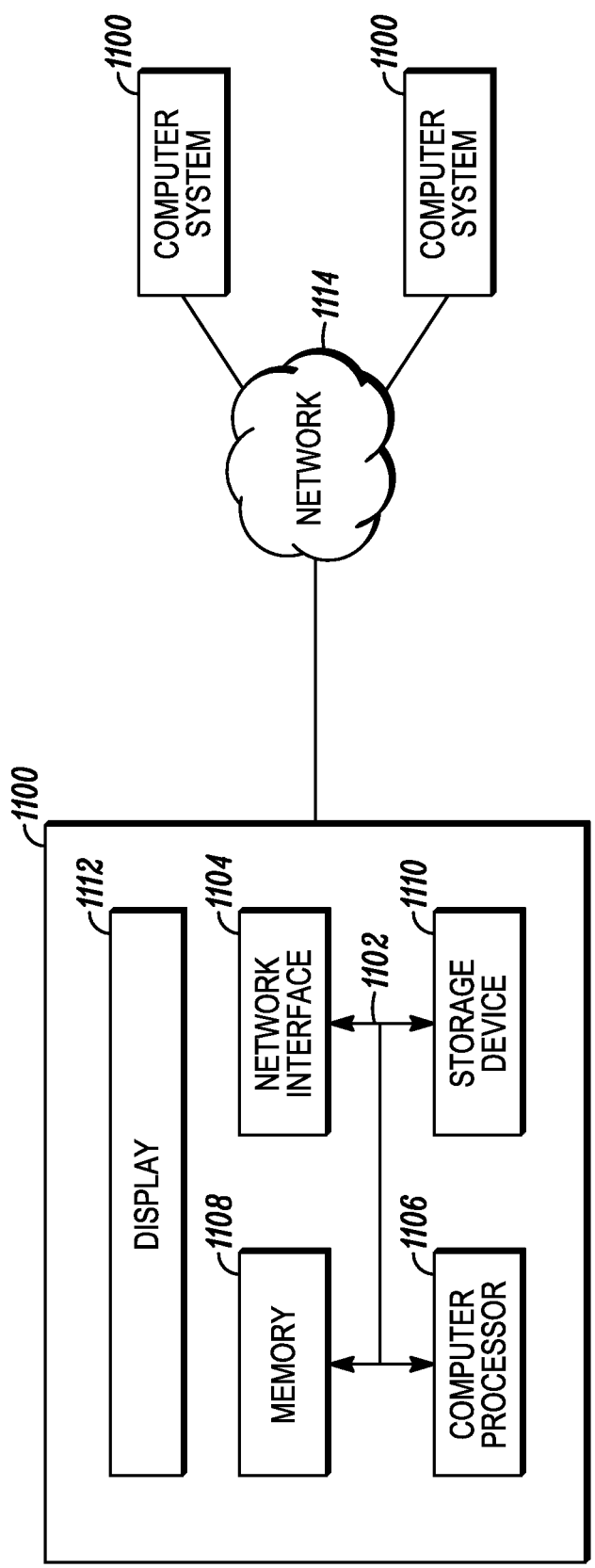
FIG. 11 illustrates an example of a special purpose computer system configured with a telestration interface according to one embodiment.

FIG. 11 illustrates an example of a special purpose computer system 1100 configured with a telestration interface according to one embodiment. Computer system 1100 includes a bus 1102, network interface 1104, a computer processor 1106, a memory 1108, a storage device 1110, and a display 1112.

Bus 1102 may be a communication mechanism for communicating information. Computer processor 1104 may execute computer programs stored in memory 1108 or storage device 1108. Any suitable programming language can be used to implement the routines of particular embodiments including C, C++, Java, assembly language, etc. Different programming techniques can be employed such as procedural or object oriented. The routines can execute on a single computer system 1100 or multiple computer systems 1100. Further, multiple processors 1106 may be used.

Memory 1108 may store instructions, such as source code or binary code, for performing the techniques described above. Memory 1108 may also be used for storing variables or other intermediate information during execution of instructions to be executed by processor 1106. Examples of memory 1108 include random access memory (RAM), read only memory (ROM), or both.

Storage device 1110 may also store instructions, such as source code or binary code, for performing the techniques described above. Storage device 1110 may additionally store data used and manipulated by computer processor 1106. For example, storage device 1110 may be a database that is accessed by computer system 1100. Other examples of storage device 1110 include random access memory (RAM), read only memory (ROM), a hard drive, a magnetic disk, an optical disk, a CD-ROM, a DVD, a flash memory, a USB memory card, or any other medium from which a computer can read.

Memory 1108 or storage device 1110 may be an example of a non-transitory computer-readable storage medium for use by or in connection with computer system 1100. The computer-readable storage medium contains instructions for controlling a computer system to be operable to perform functions described by particular embodiments. The instructions, when executed by one or more computer processors, may be operable to perform that which is described in particular embodiments.

Computer system 1100 includes a display 1112 for displaying information to a computer user. Display 1112 may display a user interface used by a user to interact with computer system 1100.

Computer system 1100 also includes a network interface 1104 to provide data communication connection over a network, such as a local area network (LAN) or wide area network (WAN). Wireless networks may also be used. In any such implementation, network interface 1104 sends and receives electrical, electromagnetic, or optical signals that carry digital data streams representing various types of information.

Computer system 1100 can send and receive information through network interface 1104 across a network 1114, which may be an Intranet or the Internet. Computer system 1100 may interact with other computer systems 1100 through network 1114. In some examples, client-server communications occur through network 1114. Also, implementations of particular embodiments may be distributed across computer systems 1100 through network 1114.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   detecting, by a computing device, a user input for a telestration on an image being displayed on a display device;
   determining, by the computing device, a plurality of image portions of the image based on the telestration, wherein the plurality of image portions are determined by a boundary around each image portion based on the telestration;
   determining, by the computing device, a set of tags for the plurality of image portions, wherein the set of tags are determined based on image recognition of content in the plurality of image portions;
   determining, by the computing device, an operator based on the telestration, wherein the operator characterizes an operation to perform for the plurality of image portions;
   determining, by the computing device, a search query based on applying the operator to the set of tags; and
   causing, by the computing device, a search to be performed using the search query.

2. The method of claim 1, wherein detecting the user input comprises:
   detecting, by the computing device, a first user input for a first telestration for a first image portion in the plurality of image portions, wherein the first telestration is used to form a boundary around the first image portion; and
   detecting, by the computing device, a second user input for a second telestration for a second image portion in the plurality of image portions, wherein the second telestration is used to form a boundary around the second image portion.

3. The method of claim 2, wherein determining the operator comprises detecting, by the computing device, a third user input for a third telestration that defines the operator.

4. The method of claim 1, further comprising determining, by the computing device, a context for the operator, wherein the context is used in determining the search query.

5. The method of claim 4, wherein the context comprises a distance from one of the plurality of image portions or a location of the operator in the image.

6. The method of claim 1, further comprising determining, by the computing device, an intent for the operator, wherein the intent is used in determining the operation to perform for the operator.

7. The method of claim 6, wherein determining the intent for the operator comprises analyzing a telestration mark for the operator or performing image recognition on the telestration mark to determine the intent.

8. The method of claim 1, wherein determining the set of tags for the plurality of image portions comprises:
   sending information for the plurality of image portions to a service that performs the image recognition of content in the plurality of image portions to generate the set of tags; and
   receiving the set of tags from the service.

9. The method of claim 1, wherein the image recognition includes a text recognition or object recognition.

10. The method of claim 1, wherein causing the search to be performed comprises:
    sending, by the computing device, the search query to a service configured to perform the search using the search query to generate a search result; and
    receiving, by the computing device, the search result from the service.

11. The method of claim 1, wherein detecting the user input comprises receiving, by the computing device, the user input via an input device configured to cause the telestration to be displayed on the image being displayed on the display device.

12. The method of claim 11, wherein the input device is a remote control that includes a pointer that is used to form the telestration on the image.

13. The method of claim 11, wherein the input device includes a touchscreen that receives the user input for the telestration and causes display of the telestration on the image.

14. The method of claim 1, further comprising receiving a submit command, wherein the submit command causes submitting of the search query to determine a search result.

15. The method of claim 1, further comprising receiving a command operation, wherein the command operation causes an instruction associated with the command to be performed with respect to the telestration.

16. The method of claim 15, further comprising determining a context associated with the command operation, wherein the context is used to determine an action to perform for the instruction associated with the command.

17. The method of claim 1, further comprising outputting a search result for the search query.

18. A method comprising:
    detecting, by a computing device, a first user input for a first telestration for a first image portion;
    determining, by the computing device, a first boundary around the first image portion based on the first telestration;
    detecting, by the computing device, a second user input for a second telestration for a second image portion;
    determining, by the computing device, a second boundary around the second image portion based on the second telestration;
    determining, by the computing device, an operator for the first telestration and the second telestration, wherein the operator characterizes an operation to perform for the first image portion and the second image portion;
    detecting, by the computing device, a third telestration for a command; and
    determining, by the computing device, an action to perform with respect to the first telestration, the second telestration, or the operator.

19. The method of claim 18, further comprising:
    sending, by the computing device, the first image portion to an image processing service to have image recognition on the first image portion performed;
    receiving, by the computing device, a first set of tags describing content of the first image portion based on the image recognition;
    sending, by the computing device, the second image portion to the image processing service to have image recognition on the second image portion performed;
    receiving, by the computing device, a second set of tags describing content of the second image portion based on the image recognition;
    determining, by the computing device, a search query based on applying the operator to the first set of tags and the second set of tags, wherein the command is a search query command configured to cause a search to be performed; and
    causing, by the computing device, the search to be performed using the search query.

20. An apparatus comprising:
    one or more computer processors; and
    a non-transitory computer-readable storage medium comprising instructions that, when executed, control the one or more computer processors to be configured for:
        detecting a user input for a telestration on an image being displayed on a display device;
        determining a plurality of image portions of the image based on the telestration, wherein the plurality of image portions are determined by a boundary around each image portion based on the telestration;
        determining a set of tags for the plurality of image portions, wherein the set of tags are determined based on image recognition of content in the plurality of image portions;
        determining an operator based on the telestration, wherein the operator characterizes an operation to perform for the plurality of image portions;
        determining a search query based on applying the operator to the set of tags; and
        causing a search to be performed using the search query.

* * * * *